United States Patent [19]
Mercat et al.

[11] Patent Number: 5,429,381
[45] Date of Patent: Jul. 4, 1995

[54] FRONT CYCLE FORK MADE OF COMPOSITE MATERIAL

[75] Inventors: Jean-Pierre Mercat, Tours; Jean-Pierre Couturet, Nevers, both of France

[73] Assignee: Look S.A., Nevers Cedex, France

[21] Appl. No.: 147,975

[22] Filed: Nov. 5, 1993

Related U.S. Application Data

[62] Division of Ser. No. 795,753, Nov. 21, 1991, abandoned.

[30] Foreign Application Priority Data

Dec. 12, 1990 [DE] Germany .................... 40 39 405.0
Sep. 18, 1991 [DE] Germany .................... 41 31 082.9

[51] Int. Cl.⁶ ............................................. B62K 21/02
[52] U.S. Cl. ..................................... 280/279; 280/280
[58] Field of Search ............... 280/274, 275, 276, 279, 280/280, 281.1

[56] References Cited

U.S. PATENT DOCUMENTS

| | | | |
|---|---|---|---|
| 371,266 | 10/1887 | Knous | 280/279 |
| 2,687,898 | 8/1954 | Schwinn | 280/276 |
| 2,756,070 | 7/1956 | Torre | 280/276 |
| 4,008,903 | 2/1977 | Ramond | 280/279 |
| 4,189,167 | 2/1980 | Dubois | 280/279 |
| 4,939,950 | 7/1990 | Girvin | 280/279 |
| 5,039,470 | 8/1991 | Bezin et al. | 280/279 |

*Primary Examiner*—Margaret A. Focarino
*Assistant Examiner*—Victor E. Johnson
*Attorney, Agent, or Firm*—Merchant & Gould, Smith, Edell, Welter, & Schmidt

[57] ABSTRACT

The invention relates to a front fork (10) for cycles, made of composite material, comprising two fork arms (12, 14) which unite to form an upper fork head (18). The fork head (18) comprises two rearwardly directed projections, an upper projection (30) and a lower projection (28). The two projections carry pivot portions (36, 38) which cooperate with complementary pivot portions (32, 34) provided on the steering head (24) of the frame. The fork arms (12, 14) are formed substantially linear and their centrelines are arranged at least generally in a plane in which the centreline of the fork head (18) also extends. This plane is located forwardly of the steering axis (YY) at a distance which depends on the dimensions of the cycle and is suitable to ensure the stability of the cycle.

8 Claims, 11 Drawing Sheets

Fig. 6
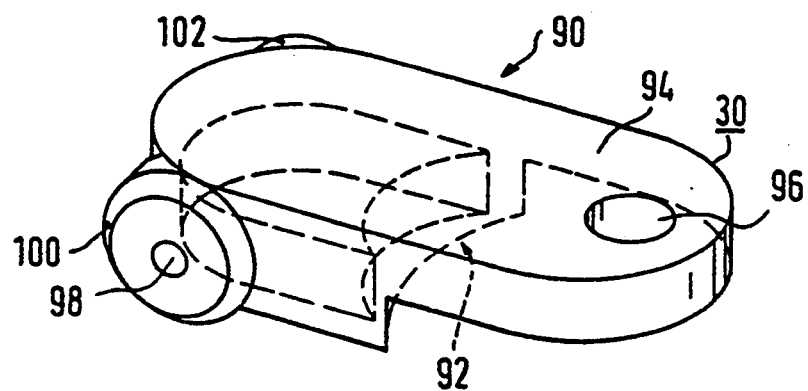
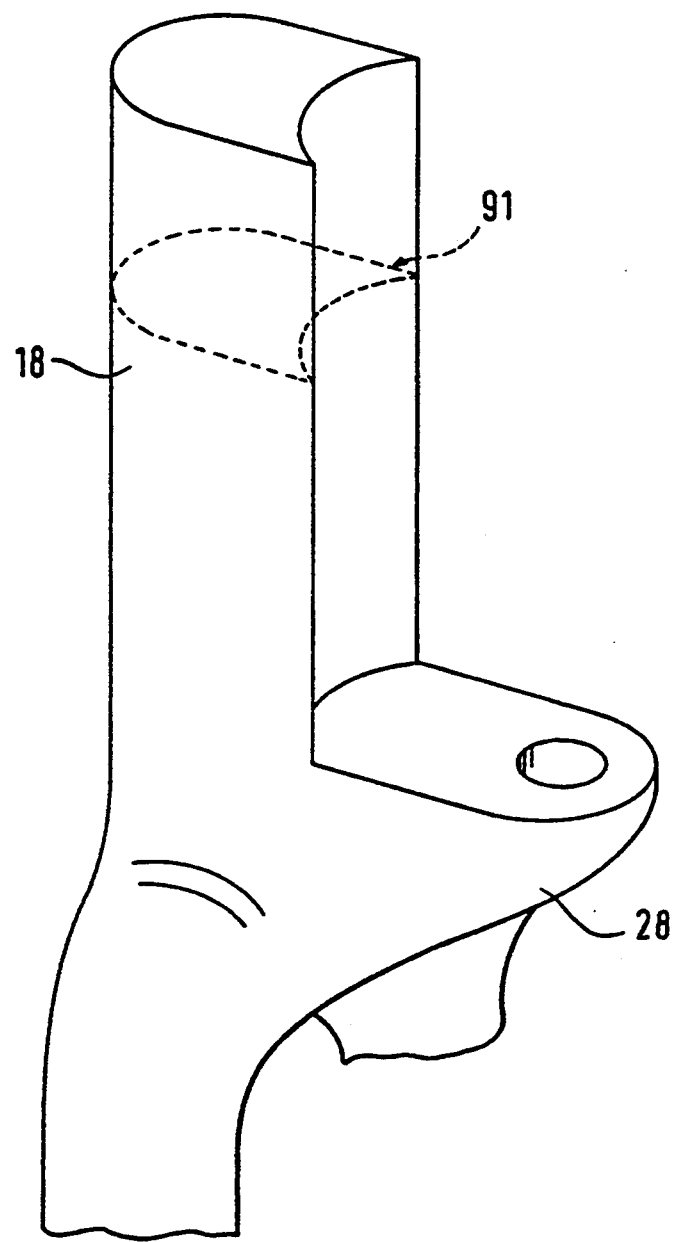

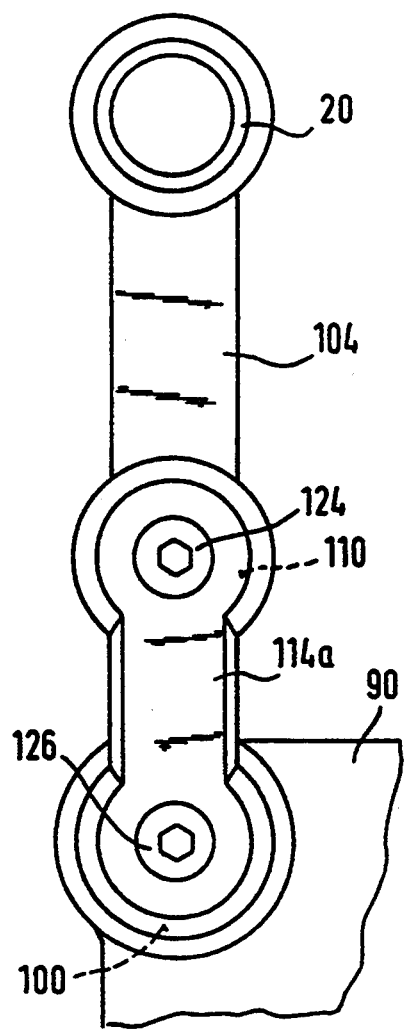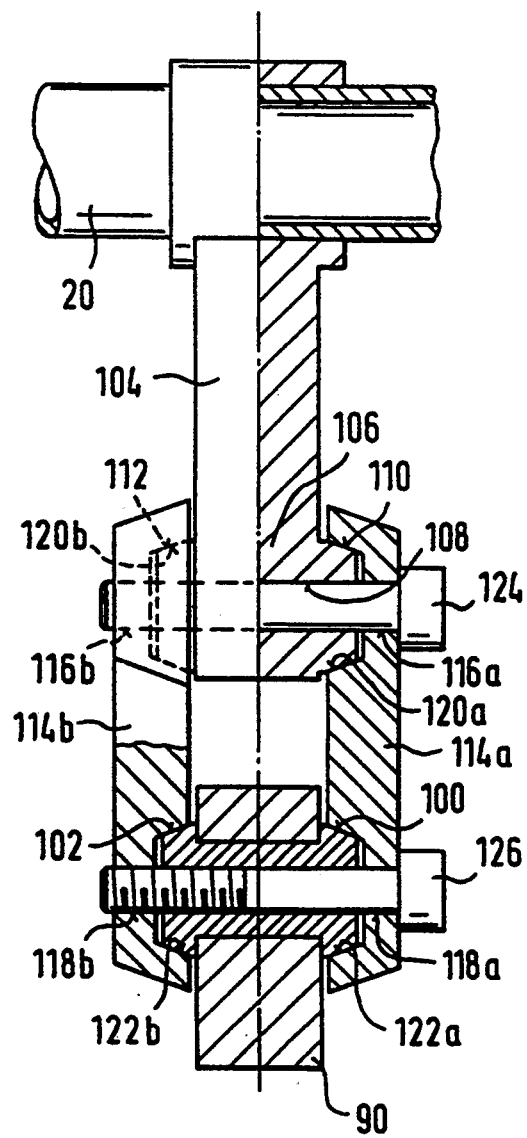

FRONT CYCLE FORK MADE OF COMPOSITE MATERIAL

ALL CROSS REFERENCE TO OTHER APPLICATIONS

This application is a divisional application of Ser. No. 07/795,753, filed Nov. 21, 1991, as now abandoned.

FIELD OF THE INVENTION

The present invention relates to a front fork for cycles, made of composite material.

BACKGROUND OF THE INVENTION

Owing to their exceptional properties, notably their advantageous weight-to-resistance ratio, composite materials find numerous applications in the field of cycle construction, in particular cycle frames, and allow a substantial weight reduction, so that aerodynamical shapes for the individual bars or tubes of the frame may be achieved.

The front fork is however hardly suitable to the use of these materials. Indeed, conventional forks made of metal or light metal alloys terminate at their upper end by a cylindrical fork head which passes through a steering tube provided in the frame and is supported for rotation by means of two ball bearings at the two ends of the steering tube. The handlebar is fixed at the top of this fork head by means of clamping members. Since the rotation axis of the wheel must be located forwardly of the steering axis for stability reasons, the arms of the fork have a curved shape with a forwardly oriented concavity.

Since this structure has been confirmed for a long time because of its simplicity and its efficiency, it has simply been retained during the first attempts to realize the fork with composite materials. These attempts have however led to relatively bad results. In fact, considerable flexion torques are exerted on the cylindrical head at the top of the fork, most particularly at the height of the lower bearing of the associated steering tube or head. When dealing with a fork head made of metal, it is easy to select the metal and the wall thickness, in order to take up these flexion torques without deformation. On the contrary, when dealing with composite materials, it is extremely difficult to achieve a sufficient moment of inertia without detrimentally increasing the outer diameter of the fork head.

In order to remedy some of these drawbacks, U.S. Pat No. 4,008,903 discloses a front fork made of molded plastic material comprising two fork arms which unite to form an upper fork head, the latter comprising two rearwardly directed projections, an upper projection and a lower projection. These projections both carry pivot portions which cooperate with complementary pivot portions of the steering head of the frame which define a steering axis. However, this document does not teach how the rigidity of the fork head is ensured. Further, the outline of this fork head has numerous reliefs which are prejudicial to the aerodynamism of the cycle.

It is finally noted that in the front fork shown in U.S. Pat. No. 4,008,903, the fork arms are curved forwardly such that the axis of a wheel attached at their ends is forwardly off-set with respect to the steering axis, by the distance necessary for ensuring the stability of the cycle in a known manner.

While it is easy to make the curved fork arms of metal, the manufacture of such curved fork arms is significantly more difficult when using composite materials as the orientation of the reinforcement fibres must be very precise in these materials, which however cannot be guaranteed in all circumstances because of the lack of precision of the manual insertion. For economical reasons, it is almost impossible to carry out an automated insertion, and for these reasons, it is thus usual to continue to make these forks at least partly of metal.

Besides, it is desirable to mount the handlebar with possibility of adjustment both upwardly/downwardly as well as in the forward/rearward direction in order to be able to take into account the body dimensions of the cyclist as well as the particular conditions of a circuit, notably during a cycle race. To this end, it is known to provide devices with two telescopic arrangements, a vertical one and a horizontal one, which can be easily realized with metal but not with composite materials.

In certain cases, in particular for cycle races, the handlebar is lowered down to below the height of the upper bearing of the steering tube, in fact by means of bent pieces which are attached at the top of the fork head and extend downwardly. These devices are complex and necessitate numerous preparation steps and the exchange of components before each corresponding adjustment or adjustment modification.

SUMMARY OF THE INVENTION

The object of the invention is thus to realize a front cycle fork made of composite material, which avoids the above mentioned drawbacks, which has a high strength and has, in particular at the level of its lower pivot mounting on the steering head of the frame, a sufficient moment of inertia for being capable of bearing the considerable flexion torques which are exerted in this area, which can be simply and cheaply manufactured and mounted, which contributes to the aerodynamism of the cycle, and which provides augmented possibilities for the mounting and the adjustment of the handlebar.

In accordance with the present invention, this object is met in a kind of fork mentioned at the beginning, in that the fork arms are realized substantially linear and their centerlines are arranged at least generally in a plane in which the centreline of the fork head is contained, said plane being located forwardly of the steering axis at a distance depending of the dimensions of the cycle and suitable for ensuring the stability of the cycle.

Thus, owing to the invention, since the fork head is located forwardly of the steering axis, it is not necessary to use curved arms in order that the rotation axis of the wheel fixed at the ends of the arms is off-set forwardly with respect to the steering axis.

As a result, the manufacture and the mounting of the fork are particularly simple, even when the fork is made of a composite material reinforced with high strength fibres (glass fibers, aramidfibers, carbon fibers for example) the orientations of which must be very precisely respected in all points of the fork.

In accordance with an advantageous embodiment of the invention, the upper rearwardly directed projection of the fork head is provided on a cap separate from the fork head, which can be assembled at the upper end of the fork head. Preferably, the projection or the pivot portion carried by this projection is removably attached to the cap or to the fork head itself. Expediently, the cap comprises means for mounting the handlebar.

Further, in accordance with the invention, a front cycle fork, notably comprising the afore-mentioned features, is provided with means for mounting the handlebar at the end of its fork head, and these mounting means comprise adjustment means with two displacement modes, of which at least one is a rotation, preferably two rotations.

Other advantageous aspects of the invention are indicated in the subordinate claims.

BRIEF DESCRIPTION OF THE DRAWINGS

Further details and advantages of the invention will clearly appear on reading the ensuing description, with reference to the appended drawings; in the drawings:

FIG. 6 is a partial perspective view illustrating an advantageous embodiment of a fork cap, FIG. 7a and FIG. 7b are side and front views respectively of an adjustable handlebar support which can be used with the fork of the invention.

DETAILED DESCRIPTION OF THE PREFERRED EMBODIMENTS

The front cycle fork illustrated in the figures is made of composite material, i.e. comprising high strength fibres, such as glass fibres, aramid fibres, carbon fibres, etc. in a resin binder, notably epoxy or polyamide resin.

Figure 1:
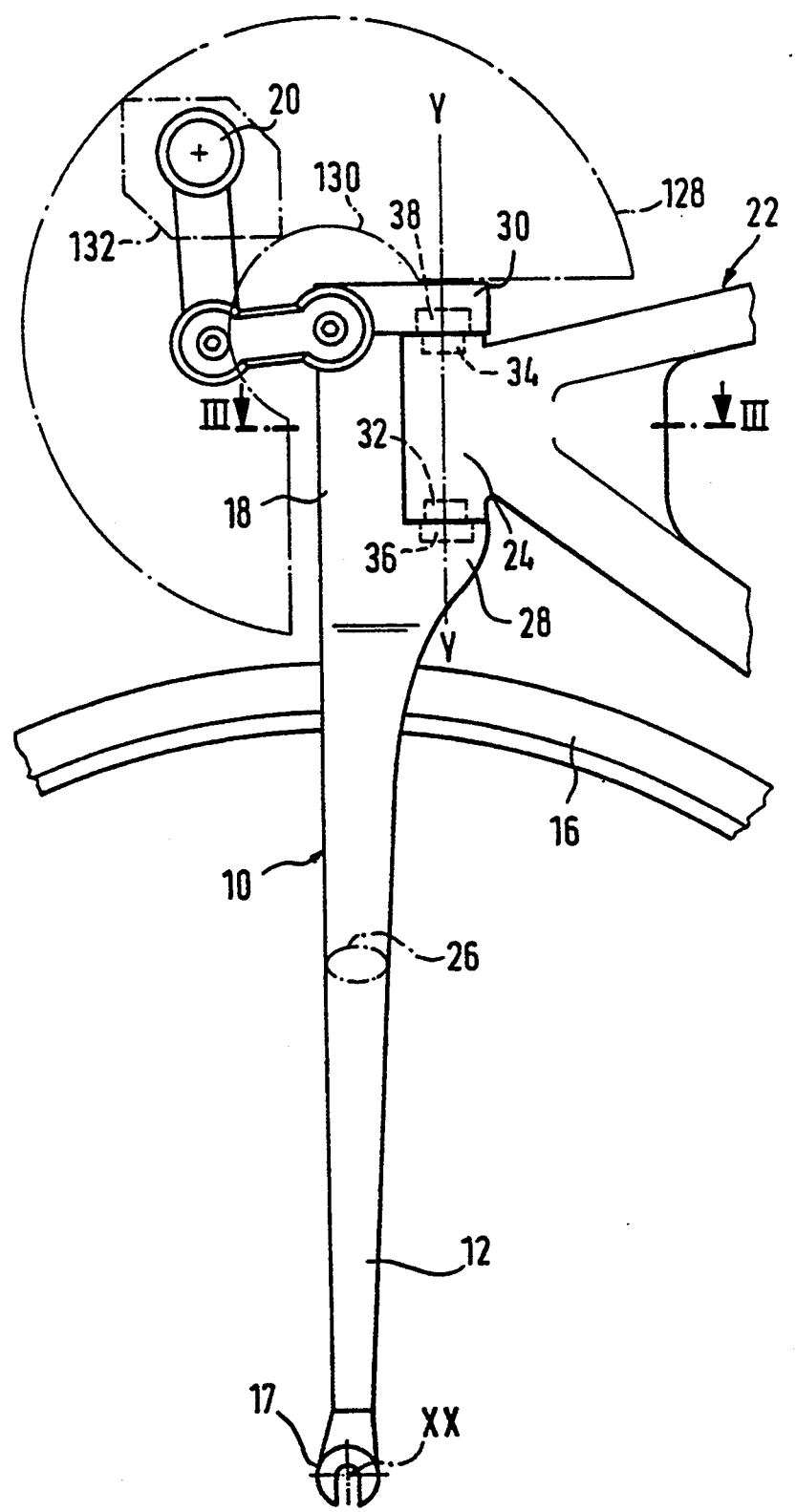
FIG. 1 is a side view of a front cycle fork in accordance with the invention.
Figure 2:
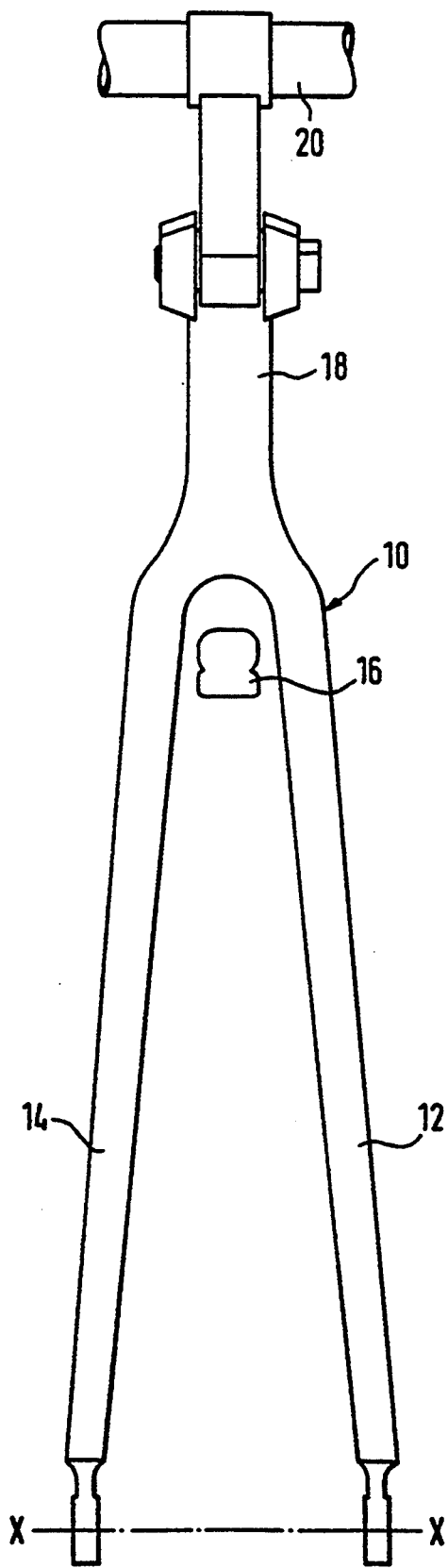
FIG. 2 is a front view of the fork shown in FIG. 1.

As shown in FIGS. 1 and 2, the fork 10 comprises two substantially linear parallel arms 12 and 14, spaced apart at a sufficient distance for accommodating a cycle wheel 16. It must be noted here that the fork shown in FIG. 1 is to be observed by slightly turning the figure in clockwise direction such that the fork is inclined, with the wheel axis located forwardly, i.e. towards the left of the figure. The ends of the arms form a yoke 17 which allow the fixation of the wheel axis not shown, such that the wheel rotates about an axis XX. In the vicinity of their upper ends, the two arms 12, 14 unite into a fork head 18 which carries the handlebar 20 and which is rotatably mounted on the frame 22 of the cycle, more precisely on this portion at the front of the frame usually called steering tube or head 24, such that a rotation about a steering axis YY defined by the steering head 24 is possible.

In this way, the centrelines of the two arms 12, 14 of the front fork and the centreline of the head 18 are located substantially in a common plane and the rotation axis XX of the wheel is forwardly off-set with respect to the steering axis YY by the distance necessary for ensuring the steering stability of the cycle in a known manner although the arms are linear, and not curved as it is the case in known cycles. The advantages of the linear fork arms 12, 14 are a simplification of the manufacture and a better resistance to the compression and flexion efforts.

The fork arms 12, 14 have an oval-shaped cross section 26 in order to exhibit a lower aerodynamic resistance.

The fork head 18 is placed forwardly along the steering tube 24. It carries two rearwardly directed projections, a lower projection 28 located just above the area where the two arms 12, 14 unite, and an upper projection 30 located at the upper end of the fork head 18. The distance between the two projections 28, 30 corresponds here substantially to the length of the steering head or tube 24. The steering head is mounted between the two projections 28, 30 and carries at its two ends pivot portions 32, 34 which cooperate with complementary pivot portions 36, 38 carried by the projections, whereby the steering axis YY is defined. Embodiments of these pivots will be described in more detail hereinafter.

Figure 3:
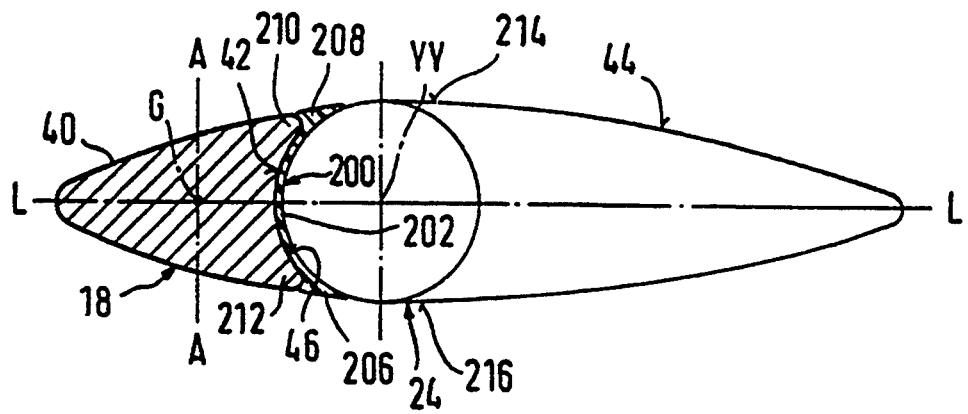
FIG. 3 is a horizontal cross sectional view of the fork and the frame, taken along line III—III in FIG. 1.

The cross section of the fork and the frame, taken along line III—III in FIG. 1, is illustrated generally in FIG. 3.

The cross section of the fork head 18 has an aerodynamic outline formed by an outer ogive-shaped outer portion 40 and by a concave base 42 in the shape of a circle segment centered on the steering axis YY. The cross section of the steering head 24 also has an aerodynamic outline 44 which completes that of the fork head 18 and terminates at the front in a convex portion 46 having the shape of a circle segment likewise centered on the steering axis YY, such that there remains a slight play between the fork head 18 and the steering head 24.

The outlines of the fork head 18 and the steering head 24 form together an outline having the shape of a tear drop.

The width of the fork head 18 is approximately equal to the width of the steering tube 24. The necessary strength is ensured by dimensioning the length and selecting the outline of the transverse cross section of the fork head 18. In this way, it is possible to ensure that the moment of inertia, at least with respect to a line AA perpendicular to the longitudinal axis LL of the cycle and passing through the gravity centre G of the cross section, is at least equal to a predetermined value, such that the fork head 18 can resist without deformation the flexion torques about the line AA. The moment of inertia with respect to the longitudinal axis LL is also at least equal to a predetermined value, such that the fork head 18 can also resist without problem the flexion torques about this longitudinal axis.

Figure 14A:
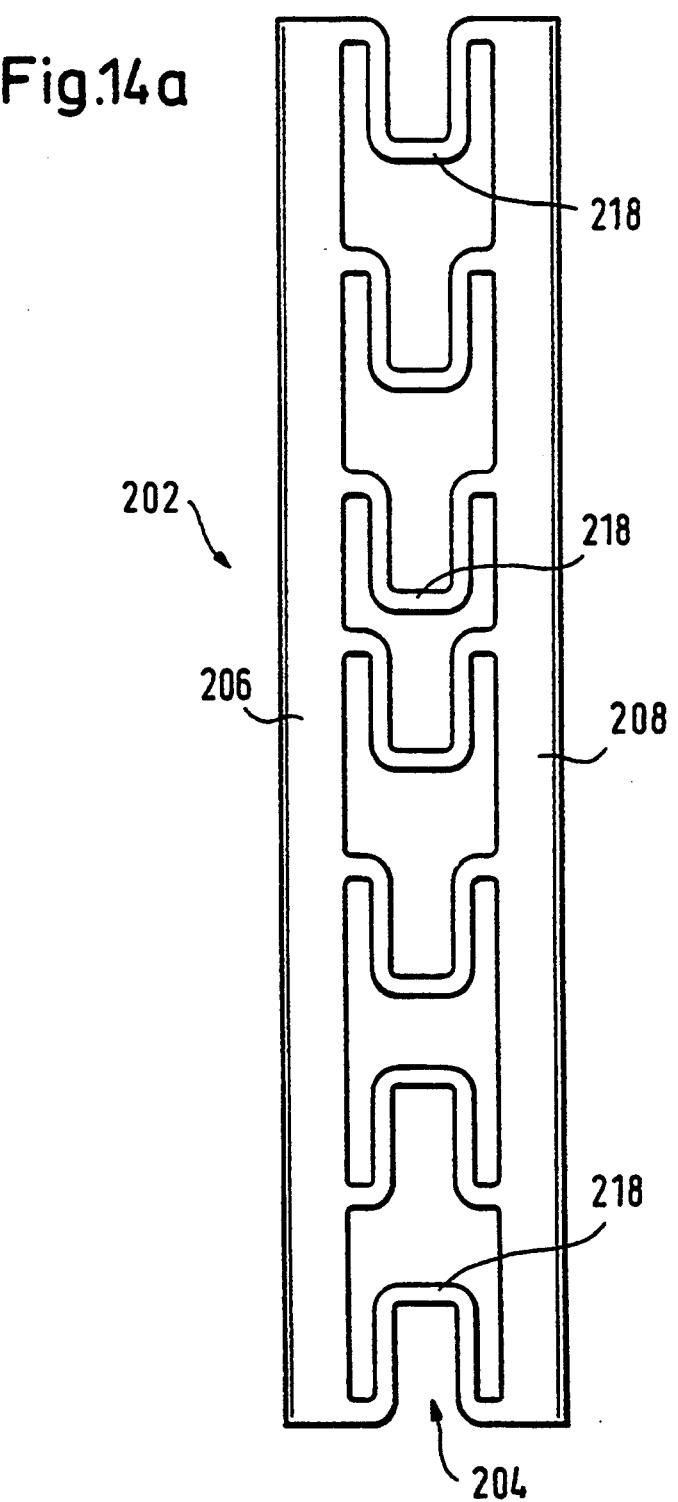
FIG. 14a and 14b are plane and cross sectional views respectively of an intermediate part mounted between the fork head and the frame and acting as a rotation abutment.
Figure 14B:
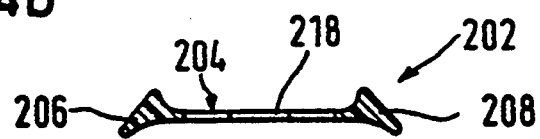

As shown in FIG. 3, in the gap 200 separating the fork head 18 and the steering tube 24 is advantageously provided an intermediate member having the shape of a band 202 of elastomeric material, shown in detail in FIGS. 14a and 14b. The band comprises a middle web 204, the thickness of which is at most equal to the width of the gap 200 and the width of which is slightly lower than the developed length of the gap in the horizontal direction. At its two edges, the band 202 comprises two longitudinal beads 206, 208 which extend vertically substantially over the entire length of the steering tube once the band is mounted and are internally profiled in a manner corresponding to the fork head 18 and to the steering tube 24, and externally in such a manner as to ensure as perfect a continuity as possible of the outer outline between the head 18 and the tube 24.

The band 202 fulfils thus two important functions: firstly, it improves the aerodynamism of the assembly comprised of the fork head 18 and the steering tube 24 by ensuring the continuity of their drop-shaped outline; secondly, it forms a lateral damper for the case where the fork head comes in a limit rotary position with respect to the steering tube 24, in which either one of the two rear lips 210, 212 of the outline of the fork head would come in abutment against one or the other of the sides 214, 216 of the steering tube. In the latter case, the respective longitudinal bead 206 or 208 is crushed between the lip 210 or 212 of the fork head and the corresponding side 214 or 216 of the steering tube, such that a direct contact between the latter is avoided and a damaging of the composite material of the head 18 and/or the tube 24 is prevented.

The middle web 204 is preferably formed by a series of transverse strips 218 having at least generally the shape of a U in order to have a certain longitudinal elasticity. However, it is also possible to envisage straight strips, or else a continuous web over the entire length of the band 202 and having a certain elasticity. Thus, during the mounting, the middle web 204 is slightly stretched and the longitudinal beads are forced in all circumstances in contact with the head 18 and the tube 24.

Figure 4:
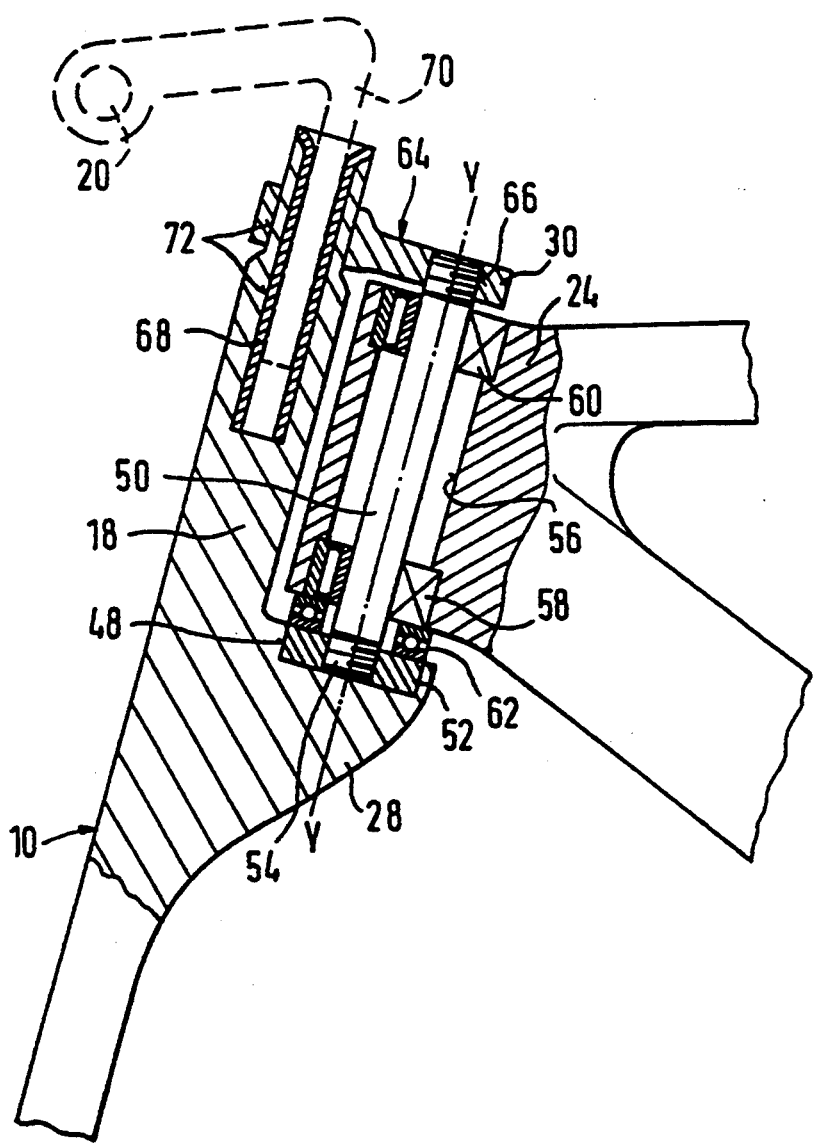
FIG. 4 is an enlarged vertical cross sectional view of an embodiment of the pivot mounting of the fork on the frame.

FIG. 4 illustrates a first embodiment of the pivot mounting between the fork head 18 and the steering head 24. The lower projection 28 is made in one piece with the fork 10 and is provided with a bore 48 for receiving an axle 50. Preferably, the projection 28 comprises an inwardly threaded ring-shaped insert 52 and the axle terminates in an outwardly threaded portion 54 which is screwed into the insert 52. The steering head 24 is provided with a cylindrical passage 56 through which extends the axle 50 and at the two ends of which are mounted two bearings 58 and 60, advantageously needle bearings, which bear the axle 50. An abutment ball bearing 62 is interposed between the lower face of the head 24 and the upper face of the projection 28, and takes up the forces directed along the steering axis YY. The upper projection 30 is provided on a cap 64 secured on the top of the fork head 18 by any appropriate force-locked or form-locked connection, for example by gluing. It is provided with a bore 66 coaxial to the steering axis YY, which receives the upper end of the axle 50, preferably without play. The axle is provided for example with a hollow hexagonal recess at its upper end, which allows to unscrew the axle from the insert by means of an hexagonal tool, and thereafter to remove the axle by sliding in order to disassemble the fork.

Figure 13:
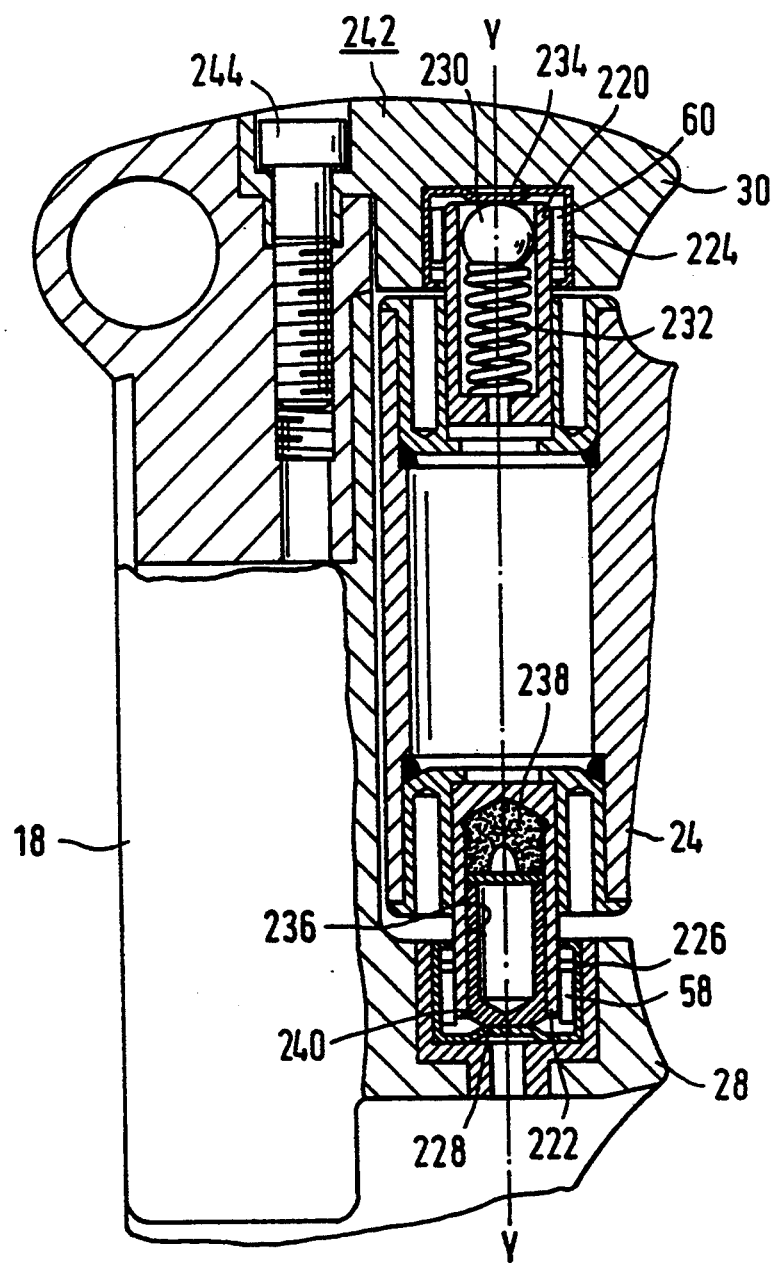
FIG. 13 is a vertical cross sectional view similar to that of FIGS. 4 and 5 illustrating a preferred practical embodiment of the fork head and of its pivot mounting on the frame.

The advantage to provide that the bearings interposed between the pivots and the inserts are needle bearings is that this kind of bearings resists very well to radial efforts without long-term marking of the running races owing to the linear contact between the needles and their running races. For taking up axial efforts along the axis YY, it is possible to dispense with an abutment roller bearing and to provide a metal/metal contact over a very small surface about the steering axis YY, as shown in FIG. 13. In this figure, the steering tube carries the two pivots stems, i.e. an upper pivot stem 220 and a lower pivot stem 222, and the two upper and lower projections 30, 28 of the fork head 18 comprise sleeves 224, 226 which form outer cages for needle bearings and the two pivots constitute themselves the inner cages of the needle bearings.

The lower pivot 222 comes in contact with a boss 228 of the bottom of the sleeve 226 of the lower projection 28, over a very reduced contact surface. Thus, the axial efforts between the fork and the frame, which are transmitted between the lower pivot 222 and the boss 228 will result in an extremely low and non disturbing friction torque, all the more when considering that the rotation speeds between the fork and the frame are negligible.

In the same figure, it can be noted that the axial play of the mounting is compensated by providing that the upper pivot 220 carries a ball 230 upwardly urged by a spring 232 against the bottom 234 of the upper sleeve 224. Further, the lower pivot 222 comprises a shock damping device formed in the following manner: the pivot 222 is provided with an axial blind bore 236; a block 238 of damping material is accommodated in the bottom of the bore 236 and a piston 240 is slidably received in the lower portion of the bore and extends therefrom to come into contact with the boss 228. This will advantageously allow to damp the shocks and vibrations between the fork and the frame.

In FIG. 13, the disassembling of the fork is ensured by providing that the upper projection 30 of the fork head 18 is provided on a removable part 242, which is secured to the fork head by means of a screw 244. Therefore, it is sufficient to unscrew this screw 244 to disassemble the separate part 242 from the fork, This can be particularly advantageous for example for the transport of the cycle.

As shown in FIG. 4, the fork head 18 and the cap 64 are provided with aligned bores 72 in which a sleeve 68 is press-fitted, intended for receiving a handlebar 70. The bore 72 extends in the fork head 18 over a relatively short distance and terminates a significant distance above the lower projection 28. In fact, the removal of material which corresponds to the bore 72 causes a reduction of the moments of inertia of the cross section, which is not desirable in the area of the lower projection 28. To the contrary, this reduction is without detrimental effect in the upper portion of the fork head 18 where the occurring flexion torques are less important.

Figure 5:
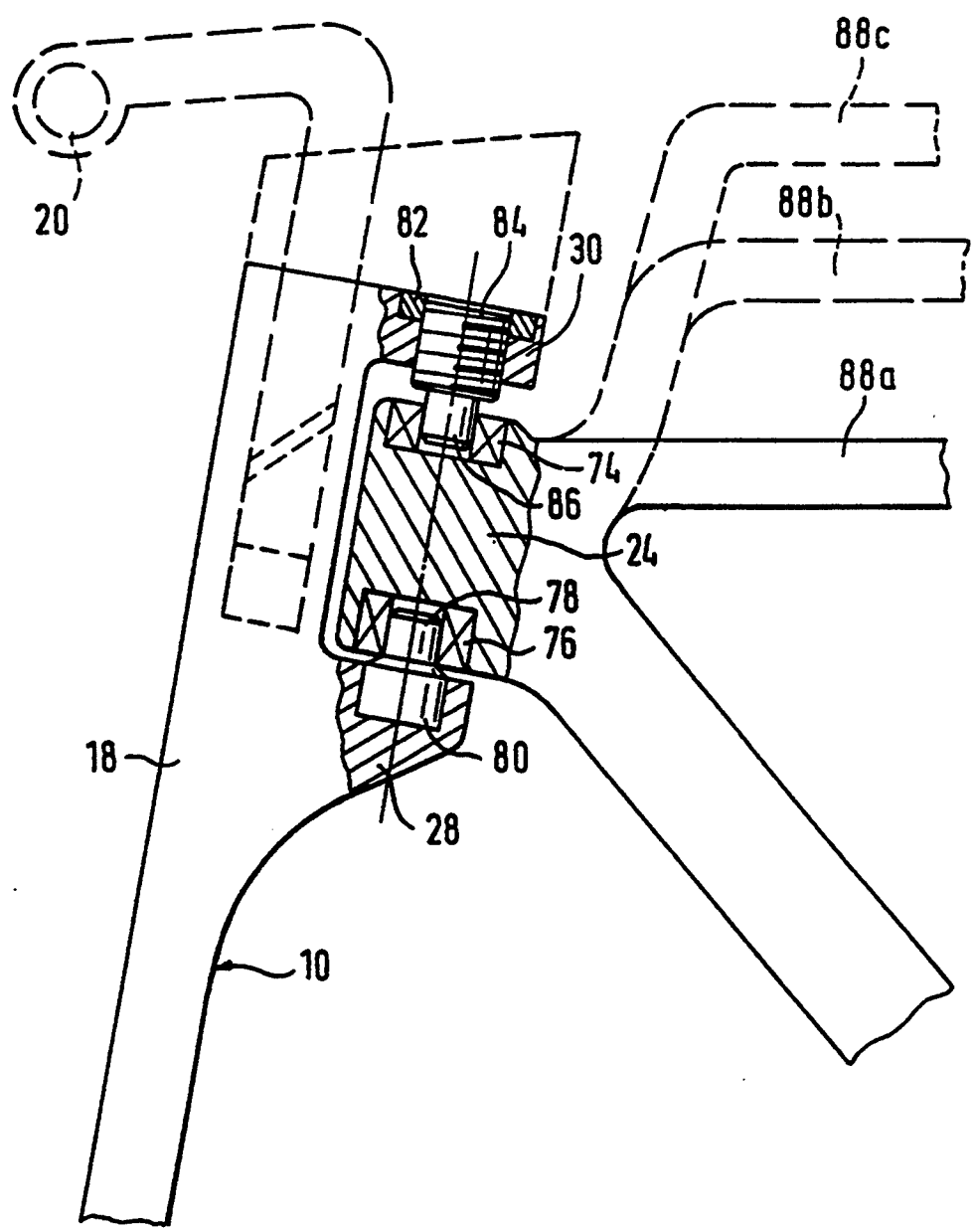
FIG. 5 is a similar vertical cross sectional view illustrating an other embodiment of the pivot mounting.

In the embodiment illustrated in FIG. 5, the steering head carries two bearings 74 and 76 at its upper and lower ends respectively. The lower projection 28 carries a short cylindrical stem 78, formed by example by an projection of an insert 80 fixed in the projection 28, and this stem 78 is engaged into the lower bearing 76. The upper projection 30 is made in one piece with the fork head 18 and comprises an inwardly threaded insert 82, into which a block 84 is screwed, likewise extended by a short cylindrical stem 86 which engages into the upper bearing 74. In this case, it will be possible to realize the steering head 24 of the frame in a solid manner.

This solution is particularly simple and resistant. However, the realization of the upper projection 30 in one piece with the fork head 18 obliges either to provide several moulds for the manufacture of the fork, in which the projections 28, 30 are located at different distances in order to take into account different frame heights—and thus different heights for the steering head 24—, or to provide that the frames are fitted with steering heads 24 of identical size, irrespective of their height. This latter solution is indicated in dotted lines in FIG. 5 where the upper tubes 88a, 88b, 88c of the frame are connected to a same model of steering head 24 by more or less curved portions 89b, 89c.

The partial perspective view of FIG. 6 shows a variant of a cap 90 on which are simultaneously formed the upper projection 30 and a handlebar mounting means, without need to provide a bore in the fork head 18. In addition, this cap 90 allows a standardized manufacture of the fork, i.e. with a fork head 18 having a length corresponding to the longest steering head 24 of a frame having the greatest height, and the fork head 18 being thereafter cut at the length which corresponds to the steering head 24 of the frame onto which it is desired to assemble the fork. This is indicated in dotted lines at 91 in FIG. 6.

The cap 90 has generally the shape of a plate provided at its lower face with a cavity 92 having a shape corresponding to the outline of the fork head 18. Once the fork head 18 has been cut at the desired length, the cap 90 is simply fitted over and bonded to the end of the fork head 18. The cap 90 comprises a rear extension 94 which forms the upper projection 30 and is provided with a throughgoing bore 96 designed either as in FIG. 4 for receiving the end of a fixed axle, or as in FIG. 5 for receiving a screwed block terminated by an axle stem.

At its forward end, the cap 90 has a throughgoing transverse horizontal bore 98 and is provided at the two ends of this bore with two raised frusto-conical blocking surfaces 100, 102 which allow to mount the handlebar in the manner which will be described in connection with FIGS. 7 to 11.

The handlebar 20 corresponds to any conventional type and has therefore not been represented entirely in the figures.

In FIGS. 7a and 7b, a short tube 104 is fixed at the centre of the middle section of the handlebar by means of a conventional clamping device and extends perpendicularly to this middle section.

At the end of the tube 104 is provided a block 106 which has a transverse horizontal throughgoing bore 108. Two raised frusto-conical blocking surfaces 110, 112 are formed at both ends of this bore. Two elongated plates 114a, 114b provided with bores 116a, 118a, 116b, 118b and with recessed frusto-conical blocking surfaces 120a, 122a, 120b, 122b near their ends are placed on either sides of the fork cap 90 and of the block 106. Screws 124, 126 are engaged in the bores of the cap and of the block and tightened in order to urge the blocking surfaces of the elongated plates against the blocking surfaces 100, 102 of the cap on the one hand, and the blocking surfaces of the block 110, 112 on the other hand. In this way, it is possible to adjust the position of the handlebar 20, both in the up-and-down direction and in the forward-and-rearward direction, about two rotation axes formed by the axes of the frusto-conical blocking surfaces. For the purpose of this adjustment, the screws 124, 126 are loosened, and thereafter tightened again.

The adjustment range depends on the respective length of the tube 104 and of the plates 114a, 114b. By way of example, it is possible to obtain a range as shown in FIG. 1 and delimited by the circular portions 128, 130, considerably broader than the range afforded by conventional devices as indicated at 132. In particular, it is noted that the handlebar can be lowered into a position located far below the upper end of the fork, without having to remove or to replace any part to that effect.

Figure 8B:
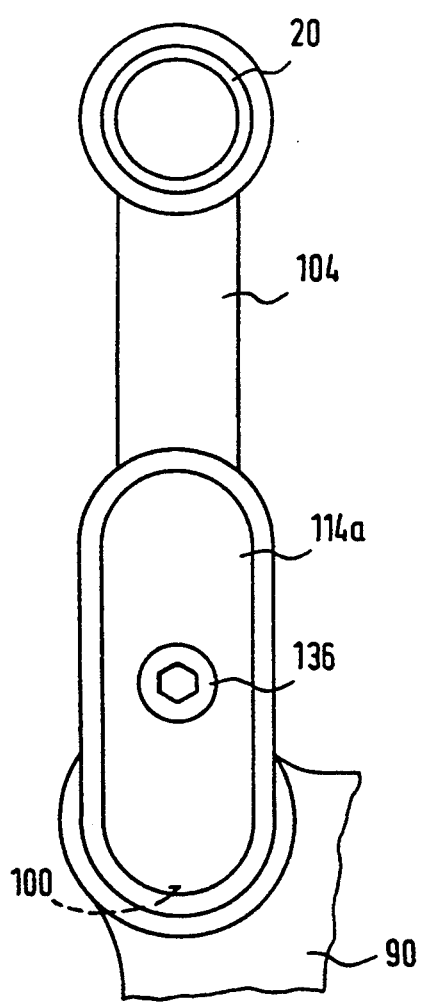
FIG. 8a and 8b are similar views of a variant of the handlebar carrier of FIGS. 7a and 7b.
Figure 8A:
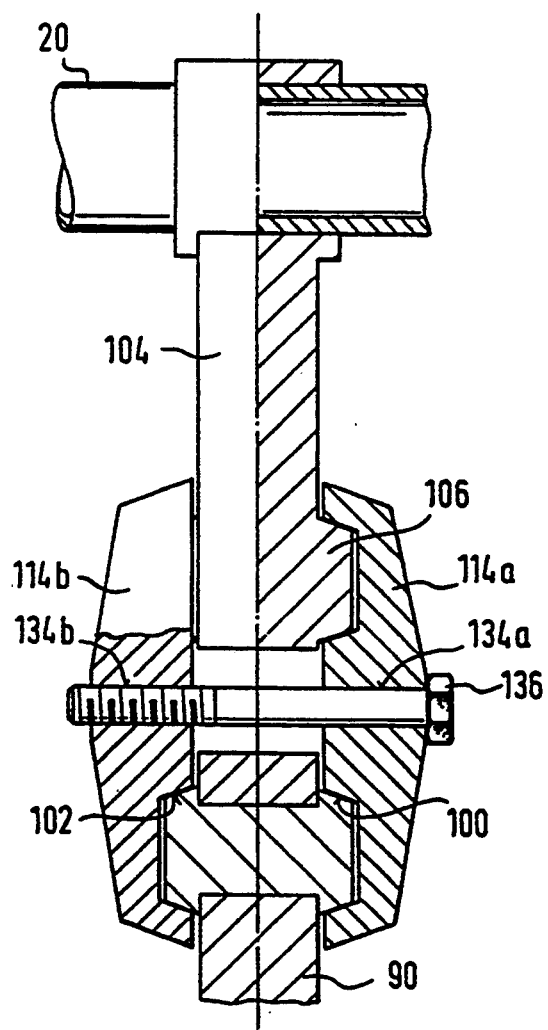

In the variant shown in FIGS. 8a and 8b, the cap 90 and the block 106 are devoid of transverse bores. The elongated plates 114a, 114b are each provided with a centre bore 134a, 134b and a single tightening screw 136 extending through these bores serves to tighten along the two adjustment axes.

Figure 9:
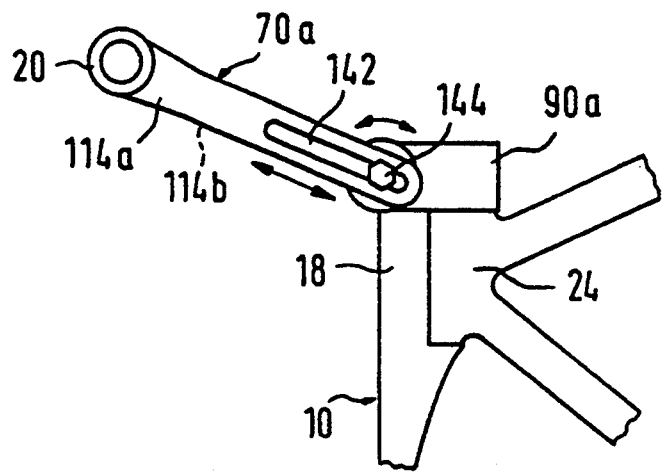
FIG. 9 is a sketch illustrating a variant of the handlebar carrier.
Figure 10:
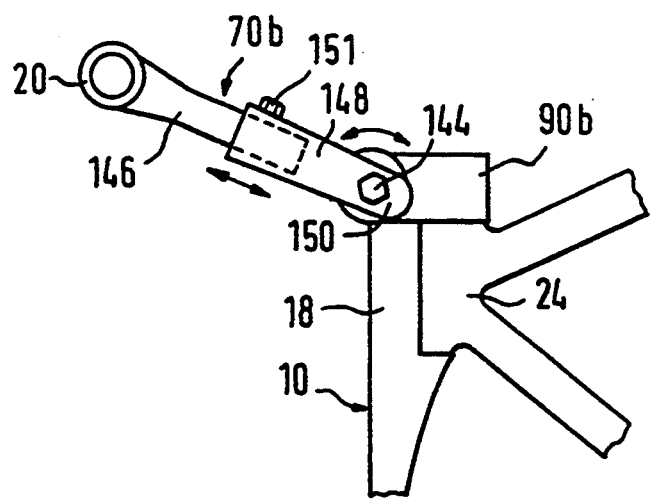
FIG. 10 is a sketch illustrating a variant of the handlebar carrier.
Figure 11:
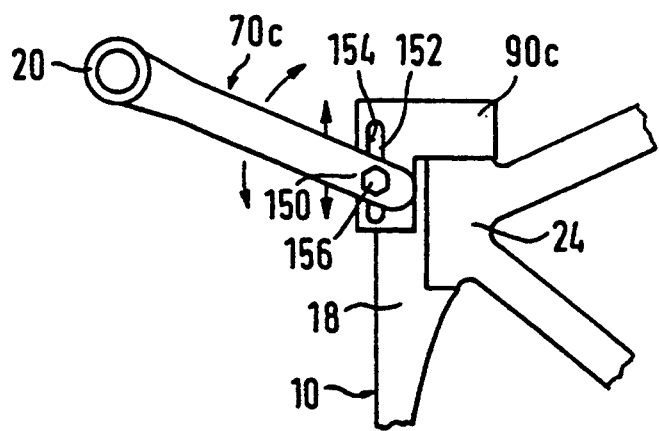
FIG. 11 is a sketch illustrating a variant of the handlebar carrier.

Other possibilities are indicated in the sketches of FIGS. 9 to 11:

Adjustment by rotation about an axis defined on the fork cap and by translation along the two clamping plates in FIG. 9; in this case, the cap 90a is provided with two blocking surfaces and one associated rotation axis, in a manner similar to that of the embodiments of FIGS. 7a and 7b. The carrying member 70a for attachment of the handlebar 20 is formed by two parallel plates 114a, 114b both provided with elongated slots 142, the borders of which also form blocking surfaces; a clamping member 144, for example a screw, is engaged in the bore of the cap 90a and in the slots 142 of the plates and allows to immobilize the plates 114a, 114b in rotation as well as in translation.

Adjustment by rotation about an axis defined on the fork cap and by translation of a telescopic arrangement which carries the handlebar. This is shown in FIG. 10.

In this case, the cap 90b is substantially identical to that of FIG. 9. However, the carrying member 70b which carries the handlebar is formed by two telescopically-mounted portions 146, 148. A first portion 146 has a tightening clamp of the handlebar 20 at its end, and the other portion 148 is shaped as a fork at its end and has two perforated lugs 150 whose inner faces also form blocking surfaces; a tightening screw 144, for example identical to the previous one, passes through the two lugs 150 and the bore of the cap 90b. This tightening screw only ensures the blocking in rotation, whereas the blocking of the two telescopic portions 146, 148 being ensured by a specific blocking screw 151.

Adjustment by rotation about an axis which is itself mounted for translation on the fork, as shown in FIG. 11. In this case, the carrier 70c for the handlebar has a fixed length and is shaped as a fork at its end, the two fork lugs 150 being perforated, like in the embodiment of FIG. 10. The cap 90c is however provided with a substantially vertical elongated opening 152 whose borders 154 form elongated blocking surfaces. A tightening screw 156 passes through the lugs of the carrying member and the elongated opening 152 of the cap 90c. This tightening screw ensures both the blocking in rotation and the blocking in translation.

Figure 12A:
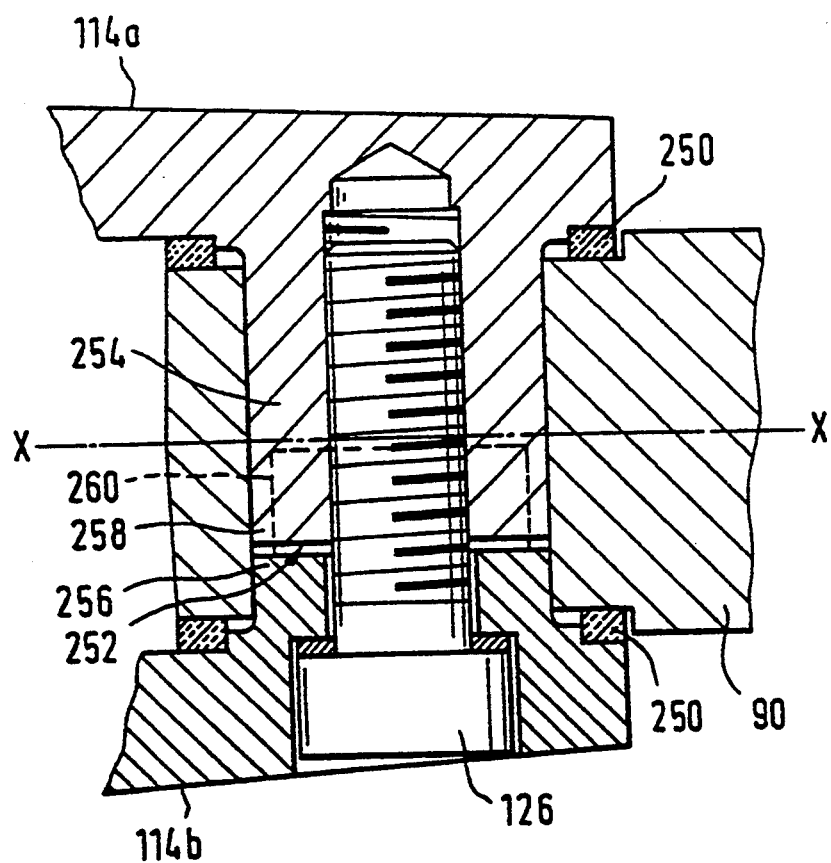
FIG. 12 is a cross sectional view of a detail of a preferred embodiment for the mounting means for the handlebar.
Figure 12B:
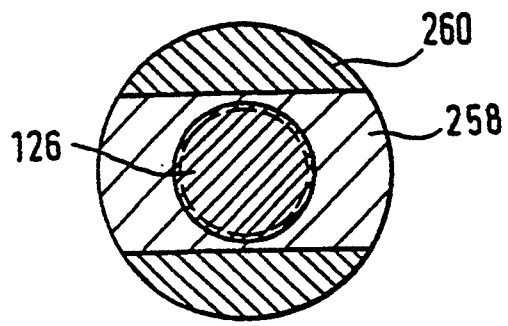

In accordance with the particularly preferred variant shown in FIG. 12, the blocking surfaces are planar, and washers 250 of ceramic material are interposed between the cap 90 of the fork and the elongated plates 114a, 114b, as well as between the latter and the block 106 of the handlebar. This variant is particularly economical since it is only necessary to machine planar blocking surfaces and since the ceramic washers are not expensive, and also particularly efficient since ceramic materials exhibit an excellent friction coefficient with respect to the materials of the cap of the fork, of the elongated plates and of the block of the handlebar.

In FIG. 12, it is further noted that the two elongated plates 114a, 114b mutually cooperate by means of a form-locked mechanical connection 252. To this end, the two plates comprise projections 254, 256, for example as shown about the rotation axis, and are terminated one by a male fitting 258 and the other by a female fitting 260 having complementary shapes. In the illustrated embodiment, the male fitting is formed by a tenon 258 substantially parallel to the longitudinal direction of the elongated plates 114a, 114b, and the female fitting 260 is formed by a mortise also parallel to this longitudinal direction. Owing to this arrangement, the mounting assembly for the handlebar 20 resists particularly well to the torques exerted about the longitudinal horizontal axis XX of the cycle, which can occur when the cyclist exerts different or even opposed efforts on the two ends of the handlebar in a substantially vertical direction.

The advantageous aspect of these various embodiments is that it will thus be possible to manufacture various cap models adapted to the different adjustment modes described. It is then possible to select among these various embodiments of the cap as a function of the kind of use of the cycle just before the final step of the assembly of the cycle and to mount this cap on the fork head, which results in a great adaptability with simple means.

We claim:

1. A front fork for cycles made of composite material, the fork having two fork arms which unite to form a fork head defining a fork head bore, the fork head having an upper and a lower end and two rearwardly directed projections, the two projections comprising an upper projection and a lower projection, the upper projection carrying an upper pivot portion and the lower projection carrying a lower pivot portion, comprising:

a steering head having a first pivot portion and a second pivot portion;

mounting means provided by the steering head for mounting the first and second portions of the steering head to the upper and lower pivot portions of the fork head, respectively; and a separable cap on which the upper projection of the fork head is provided, the cap being releasably secured to the upper end of the fork head, the cap further defining a cap bore mutually aligned with the fork head bore and into which is fitted a sleeve adapted to receive a handlebar stem and to fasten the cap to the fork head.

2. Front cycle fork according to claim 1, further comprising adjustment means allowing two displacement modes of the handlebar, at least one of the displacement modes being a displacement in rotation.

3. Front cycle fork according to claim 1, wherein the cap corresponds to an adjustment mode of the handlebar.

4. Front cycle fork according to claim 3, wherein the displacement mode is a rotational displacement.

5. Front cycle fork according to claim 1, wherein the upper and lower pivot portions of the fork head and the first and second pivot portions of the steering head communicate by means of needle bearings.

6. Front cycle fork according to claim 5, wherein at least one of the upper pivot portion, the lower pivot portion, the first pivot portion, and the second pivot portion comprises means for the compensation of axial play of the mounting means.

7. Front cycle fork according to claim 1, wherein the first pivot portion of the steering head is removably secured to the cap.

8. Front cycle fork according to claim 7, wherein the fork head is made with a given maximum length so that it can be cut at a desired length; and wherein the cap is secured to said fork head after cutting the latter at the desired length.

* * * * *